United States Patent [19]

Henseler et al.

[11] Patent Number: 5,048,863

[45] Date of Patent: Sep. 17, 1991

[54] ANTI-COLLISION CUSHION FOR THE OCCUPANTS OF A MOTOR VEHICLE

[75] Inventors: Wolfgang Henseler, Tübingen; Manfred Müller, Deizisau; Alban Bossenmaier, Stuttgart; Egon Katz, Nagold; Horst Mast, Stuttgart; Luigi Brambilla, Böblingen, all of Fed. Rep. of Germany

[73] Assignee: Daimler-Benz AG, Stuttgart, Fed. Rep. of Germany

[21] Appl. No.: 350,406

[22] Filed: May 11, 1989

[30] Foreign Application Priority Data

May 28, 1988 [DE] Fed. Rep. of Germany ....... 3818185

[51] Int. Cl.⁵ .............................................. B60R 21/16
[52] U.S. Cl. ..................................... 280/743; 188/376
[58] Field of Search ....................... 280/743, 728, 729; 188/371, 375, 376; 244/31

[56] References Cited

U.S. PATENT DOCUMENTS

| | | | |
|---|---|---|---|
| 3,226,060 | 12/1965 | Winker | 244/31 |
| 3,550,957 | 12/1970 | Radke | 188/371 |
| 3,797,855 | 3/1974 | Wright, Jr. | 280/743 |
| 3,879,056 | 4/1975 | Kawashima et al. | 280/743 |
| 4,186,941 | 2/1980 | Scholz et al. | 280/743 |
| 4,588,208 | 5/1986 | Yoshitsugu | 188/376 |

FOREIGN PATENT DOCUMENTS

| | | | |
|---|---|---|---|
| 2030863 | 6/1970 | Fed. Rep. of Germany | 280/743 |
| 1015298 | 12/1965 | United Kingdom | 188/371 |

Primary Examiner—Charles A. Marmor
Assistant Examiner—Karin Tyson
Attorney, Agent, or Firm—Evenson, Wands, Edwards, Lenahan & McKeown

[57] ABSTRACT

An anti-collision cushion is disclosed for the occupants of a motor vehicle. Known anti-collision cushions are constructed with a central part which is connected to two side parts of equal size. A tearing fold which reduces the volume capacity, and which is formed by a rip seam, is provided on the surface of the central part. In the deployment phase an expansion occurs with high velocities in the region of the side parts, which may result in injuries to the occupant in some circumstances. In the novel anti-collision cushion the rip seams connect the connecting seams which are contiguous in the region of the tearing fold between the central part and the side parts. A reduction of the expansion and of the expansion velocity, particularly in the region of the side parts, is thereby achieved.

5 Claims, 2 Drawing Sheets

ANTI-COLLISION CUSHION FOR THE OCCUPANTS OF A MOTOR VEHICLE

BACKGROUND AND SUMMARY OF THE INVENTION

The invention relates to an anti-collision cushion of the type which is constructed with two side parts and a central part arranged between the side parts, and which is inflatable by gas from a folded initial position on a receptacle fixed to the vehicle, the volume capacity in the initial state being reduced by at least one tearing fold formed in a wall of the anti-collision cushion and fixed by rip seams which are being destroyed due to the rising gas pressure so that in the final state, the entire volume capacity of the anti-collision cushion is available.

In a known anti-collision cushion of this type disclosed in German Published Unexamined Patent Application (DE-OS) 2,722,551, a central part is provided which is arranged between two side parts of equal size. The central part is connected at its edge to the side parts by connecting seams. The anti-collision cushion is fastened to a rectangular frame which is in turn arranged on a receptacle fixed to the vehicle in the region of the instrument panel. A tearing fold fastened by an arcuate rip seam is provided on the central part of the anti-collision cushion by means of which the volume capacity of the anti-collision cushion is reduced. In the initial position the anti-collision cushion in the folded state is located on the receptacle on the instrument panel. A filling device connected to the anti-collision cushion has a plurality of consecutively trippable fuses by which gas can be supplied at different pressure stages. In the case of an accident it is therefore possible for the volume capacity of the anti-collision cushion to be controlled as a function of the intensity of the deceleration. In the case of an accident with low deceleration the anti-collision cushion unfolds only partly. In the case of very high deceleration, gas is supplied at very high pressure, so that the rip seam on the central part is destroyed, so the entire volume capacity is available. During the deployment phase from the rest position on the instrument panel into one of the two filled states an intense advance with high advance velocities is obtained in the region of the side parts of the known anti-collision cushion because the rip seams extend only on the central part. This can result in a contact between the vehicle occupants and the surface of the cushion, which may cause injuries under some circumstances. An underlying object of the invention is to construct an anti-collision cushion of the type initially mentioned so that the expansion and the expansion velocity of the anti-collision cushion during the deployment phase are reduced both in the region of the central part and also at the side parts.

This object is achieved in the case of an anti-collision cushion of the above-noted type by providing an arrangement wherein the rip seams connect connecting seams between the central part and the side parts which are contiguous in the region of the tearing fold. In the anti-collision cushion according to the invention the rip seams connect the seams between the central part and the side parts which are contiguous in the region of the tearing fold. A reduction of the expansion and of the expansion velocity of the anti-collision cushion both in the region of the central part and also in the side parts is achieved in this way. Any contact by the anti-collision cushion with the occupants of the motor vehicle during the deployment phase of the cushion is therefore prevented.

A simple embodiment of the object of the invention provides a tearing fold on the central part, which is formed by rip seams which connect the connecting seams between the central part and the side parts which are contiguous in the region of the tearing fold.

In a particularly advantageous embodiment, it is provided that a tearing fold is formed at each of two opposite wall regions of the central part. A symmetrical deployment characteristic of the anti-collision cushion is achieved by this means.

The rip seams may also be applied asymmetrically and/or executed with threads of different tearing strength according to other contemplated embodiments.

In all the embodiments of the object of the invention, the rip seams may be sewn both continuously and interruptedly. It is also contemplated to construct the rip seams as bonded seams or welded seams or the like.

Another advantage of the anti-collision cushion according to the invention is improved folding and foldability by the arrangement of the rip seams on the connecting seams.

Other objects, advantages and novel features of the present invention will become apparent from the following detailed description of the invention when considered in conjunction with the accompanying drawings.

DETAILED DESCRIPTION OF THE DRAWINGS

Figure 1:
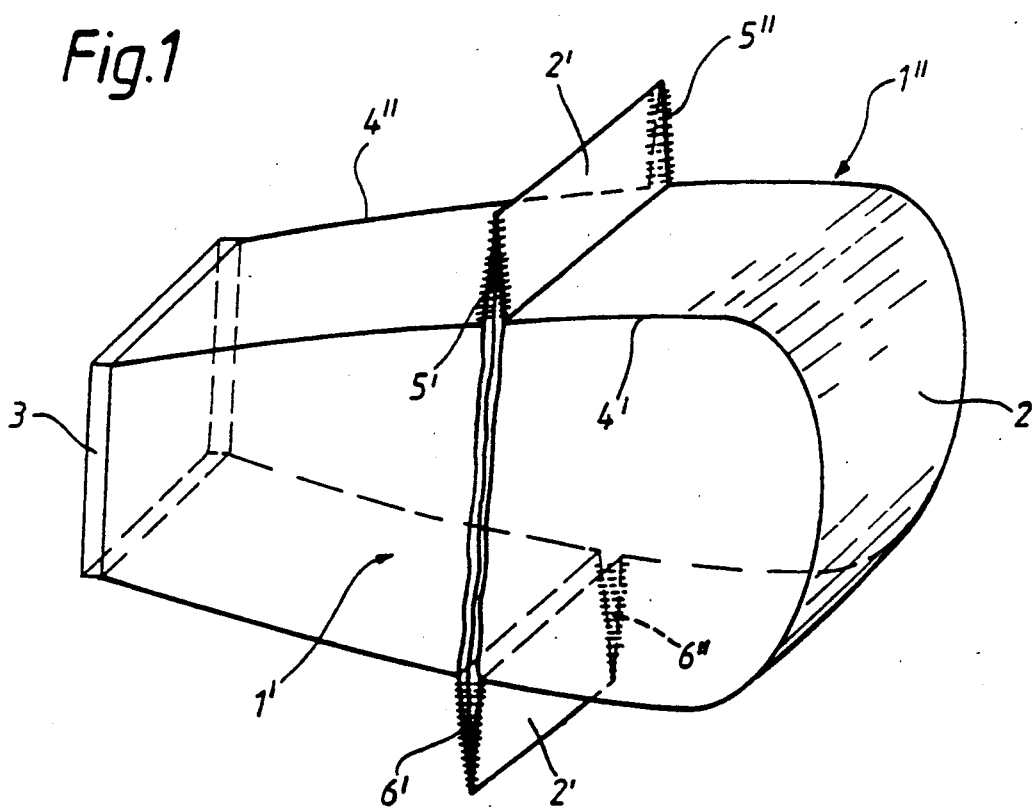
FIG. 1 shows a diagrammatic perspective view of an embodiment of the invention in the partly filled state.

An anti-collision cushion according to FIG. 1 is composed substantially of the two side parts 1', 1" of equal size and of a central part 2 located between them. The central part 2 is sewn to the side parts 1', 1" at connecting seams 4', 4". A rectangular frame 3 which is arranged in the region of the instrument panel on a receptacle, not shown in the drawing, fixed to the vehicle, is provided for fastening the anti-collision cushion.

In the initial position the anti-collision cushion is located in the folded state in the region of the frame 3. In the case of an accident, or in the case of a major deceleration, a filling device, not shown in the drawing, is actuated and supplies gas to the anti-collision cushion. The anti-collision cushion is shown in FIG. 1 in the partly filled state before the increasing internal pressure of the anti-collision cushion destroys the rip seams and releases completely the volume capacity reduced by the tearing folds 2'. The rip seam resistance of the rip seams 5, 6 produces a deployment characteristic with reduced expansion and expansion velocity of the anti-collision cushion. Because the rip seams 5', 5", 6', 6" are arranged in the region of the connecting seams 4', 4", and because the side parts are also kept shorter by their shorter connecting seam to the envelope—the expansion particularly in the region of the side parts 1', 1" is reduced. However, this also results simultaneously in a reduced expansion in the region of the central part 2. No contact with the occupants of the vehicle therefore occurs during the deployment phase.

Figure 2:
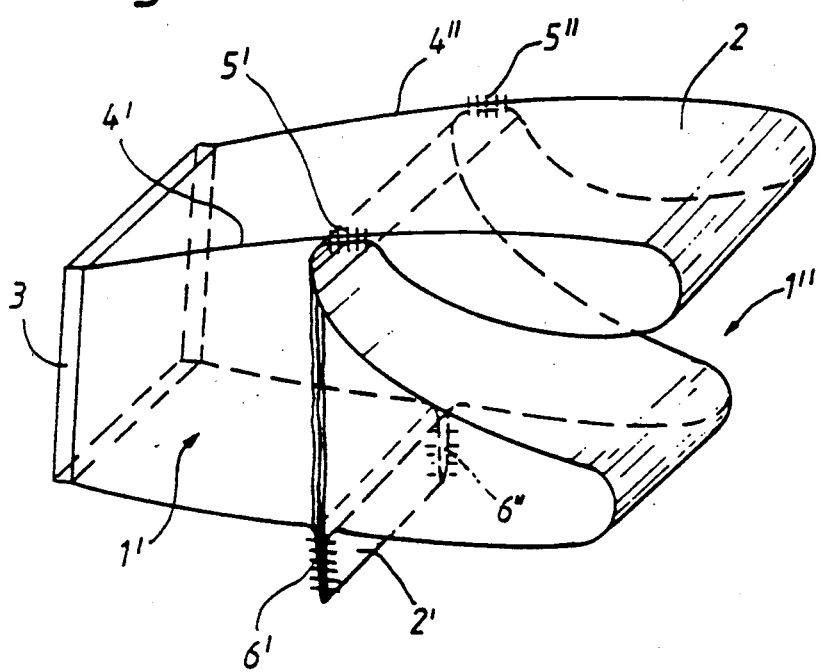
FIG. 2 shows a further embodiment in the partly filled state.

FIG. 2 shows another advantageous embodiment. The cushion is folded in pocket shape in the region of the envelope surface 2. An indrawn pocket is retained by the tearing folds 5', 5" which are provided on the connecting seams 4', 4". An outward-directed tearing fold 2' is formed on the connecting seams 4', 4" by the rip seams 6', 6". The rip seams on the side wall 1" are constructed correspondingly to the rip seams on the side wall 1'.

Figure 3:
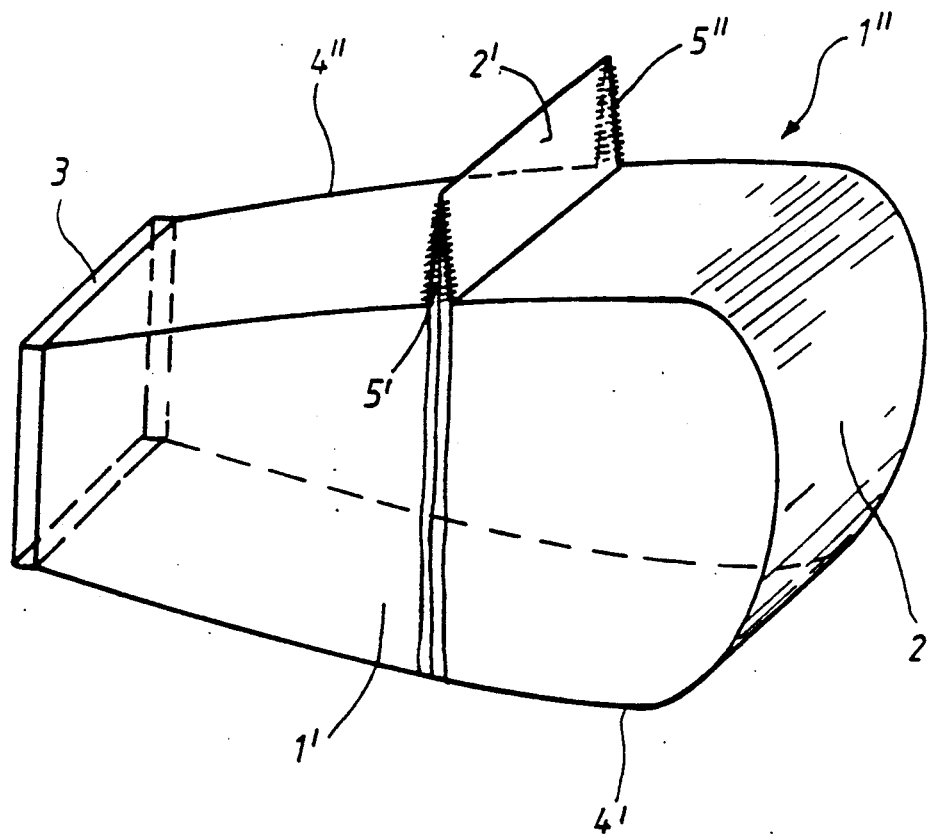
FIG. 3 shows another embodiment in the partly filled state.

A simple embodiment of the object of the invention is illustrated in FIG. 3. Only one rip seam 5', 5" is provided on each of the two connecting seams 4', 4". In the partly filled state according to FIG. 3 an outward-directed tearing fold 2' is formed on the central part 2.

The rip seams 5, 6 may be sewn both continuously and interruptedly. It is also contemplated to provide bonded seams or welded seams instead of sewn rip seams. The rip seams arranged on the connecting seams may result in an improved folding or foldability of the anti-collision cushion.

Figure 4:
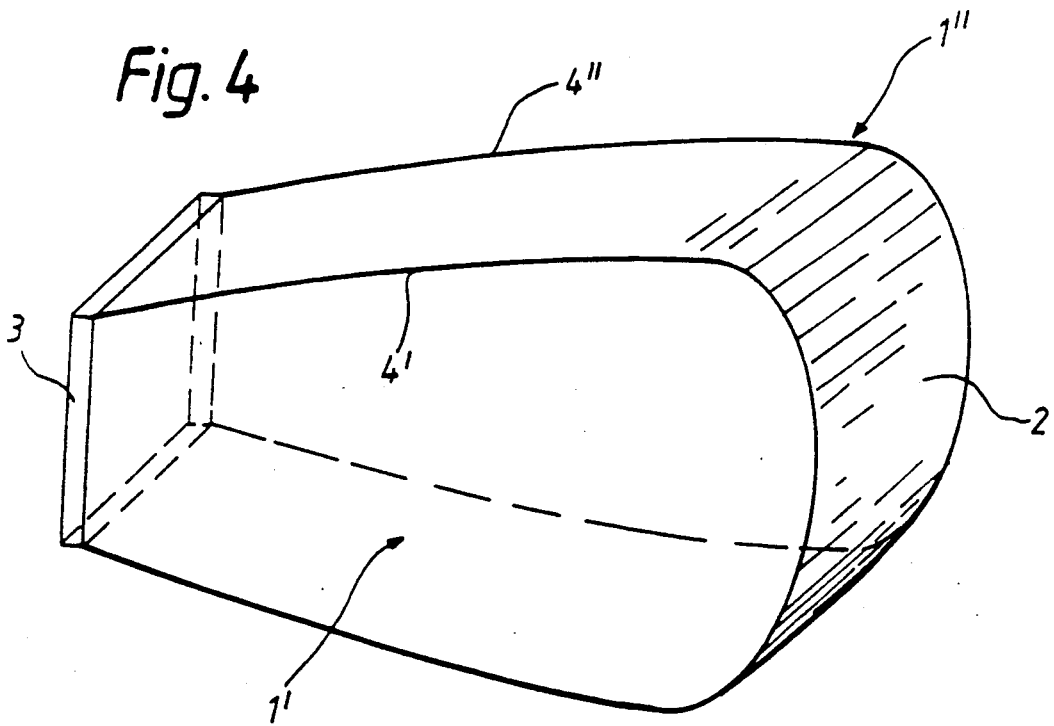
FIG. 4 shows embodiments according to FIGS. 1 to 3 in the final filled state.

FIG. 4 shows the anti-collision cushions according to FIGS. 1 to 3 in the final state. This state has been produced by the supply of gas at high gas pressure, which has resulted in the destruction of the rip seams 5, 6.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Anti-collision cushion for the occupants of a motor vehicle which is constructed with two side parts and a central part arranged between the side parts, and which is inflatable by gas from a folded initial position on a receptacle fixed to the vehicle, the volume capacity in the initial state being reduced by at least one tearing fold formed in a wall of the anti-collision cushion and fixed by rip seams which are destroyed due to the rising gas pressure so that in the final state, the entire volume capacity of the anti-collision cushion is available, wherein the rip seams connect connecting seams between the central part and the side parts which are contiguous in the region of the tearing fold, and wherein the rip seams are only in the region of the connecting seams.

2. Anti-collision cushion according to claim 1, wherein a tearing fold is formed on each of two opposite wall regions of the central part.

3. Anti-collision cushion according to claim 1, wherein the rip seams are configured to preclude abrupt expansion of the cushion parts to avoid injury to the vehicle occupant.

4. Anti-collision cushion according to claim 1, wherein a tearing fold is formed on each of two opposite wall regions of the central part.

5. Anti-collision cushion according to claim 1, wherein the rip seams connect the connecting seams in a plane passing through an intersection forming an edge portion between the central part and the side parts.

* * * * *